(12) United States Patent
Hwang et al.

(10) Patent No.: US 9,407,966 B2
(45) Date of Patent: Aug. 2, 2016

(54) METHOD AND APPARATUS FOR TRANSMITTING AND RECEIVING SIGNALING INFORMATION IN DIGITAL BROADCASTING SYSTEM

(71) Applicant: Samsung Electronics Co., Ltd., Suwon-si, Gyeonggi-do (KR)

(72) Inventors: Sung-Oh Hwang, Yongin-si (KR); Kyung-Mo Park, Seoul (KR); Sung-Ryeul Rhyu, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 14/258,592

(22) Filed: Apr. 22, 2014

(65) Prior Publication Data
US 2014/0317674 A1    Oct. 23, 2014

(30) Foreign Application Priority Data

Apr. 22, 2013 (KR) .......................... 10-2013-0044500

(51) Int. Cl.
H04N 7/173         (2011.01)
H04N 21/63         (2011.01)
H04N 21/2362       (2011.01)

(52) U.S. Cl.
CPC ......... *H04N 21/631* (2013.01); *H04N 21/2362* (2013.01)

(58) Field of Classification Search
CPC ............ H04N 5/4401; H04N 7/17309; H04N 21/462; H04N 21/454
See application file for complete search history.

(56) References Cited

U.S. PATENT DOCUMENTS

| | | |
|---|---|---|
| 2009/0094356 A1 | 4/2009 | Vare |
| 2011/0194492 A1 | 8/2011 | Vare et al. |
| 2012/0291085 A1 | 11/2012 | Song et al. |
| 2013/0094563 A1 | 4/2013 | Bae |
| 2013/0097627 A1* | 4/2013 | Hwang et al. ................... 725/25 |

* cited by examiner

*Primary Examiner* — Hunter B Lonsberry
(74) *Attorney, Agent, or Firm* — Jefferson IP Law, LLP

(57) ABSTRACT

A method for transmitting signaling information in a digital broadcasting system is provided. The method includes generating the signaling information for reception of a broadcast service, and transmitting the signaling information using at least one of a first transmission scheme and a second transmission scheme, which are different from each other in access time to a broadcast channel.

5 Claims, 12 Drawing Sheets

METHOD AND APPARATUS FOR TRANSMITTING AND RECEIVING SIGNALING INFORMATION IN DIGITAL BROADCASTING SYSTEM

CROSS-REFERENCE TO RELATED APPLICATION(S)

This application claims the benefit under 35 U.S.C. §119 (a) of a Korean patent application filed on Apr. 22, 2013 in the Korean Intellectual Property Office and assigned Serial number 10-2013-0044500, the entire disclosure of which is hereby incorporated by reference.

TECHNICAL FIELD

The present disclosure relates to a method and apparatus for a digital broadcasting system. More particularly, the present disclosure relates to a method and apparatus for transmitting and receiving signaling information in a digital broadcasting system.

BACKGROUND

Due to the development of broadcasting technology, the related-art broadcasting system providing Audio/Video (A/V) services and limited data services have provided these services using Moving Picture Experts Group-2 (MPEG2) Transport Stream (TS) which was developed by the Moving Picture Experts Group (MPEG) in 1990s. MPEG2 TS may efficiently deliver real-time A/V services and provide synchronization information of the audio and video, but due to, for example, the fixed length of 188 bytes, the limitations of multiplexing, and the complexity of the data broadcast, MPEG has begun to develop the next-generation digital broadcasting transmission system since 2008. The next-generation transmission system, referred to as MPEG Media Transport (MMT), may provide functions for A/V multimedia services, data broadcasting services, multi-screen services and the like over the broadcasting network or an Internet Protocol (IP) network. In providing broadcast services using the MMT transmission system, there is a need for a way to properly transmit signaling information used for reception of the broadcast services.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently transmitting and receiving signaling information for reception of broadcast services in a digital broadcasting system.

Another aspect of the present disclosure is to provide a method and apparatus for efficiently transmitting and receiving signaling information in Digital Video Broadcasting (DVB)-based digital broadcasting system.

In accordance with an aspect of the present disclosure, a method for transmitting signaling information in a digital broadcasting system is provided. The method includes generating signaling information for reception of a broadcast service, and transmitting the signaling information using at least one of a first transmission scheme and a second transmission scheme, which are different from each other in access time to a broadcast channel.

In accordance with another aspect of the present disclosure, a transmission apparatus for transmitting signaling information in a digital broadcasting system is provided. The transmission apparatus includes a transmission unit configured to transmit a frame including signaling information, and a controller configured to control generating of the signaling information for reception of a broadcast service, and transmitting the signaling information using at least one of a first transmission scheme and a second transmission scheme, which are different from each other in access time to a broadcast channel.

In accordance with further another aspect of the present disclosure, a method for receiving signaling information in a digital broadcasting system is provided. The method includes receiving a frame including signaling information that is transmitted using at least one of a first transmission scheme and a second transmission scheme, which are different from each other in access time to a broadcast channel, and acquiring the signaling information using at least one scheme among the first transmission scheme and the second transmission scheme.

In accordance with yet another aspect of the present disclosure, a reception apparatus for receiving signaling information in a digital broadcasting system is provided. The reception apparatus includes a reception unit configured to receive a frame including signaling information, and a controller configured to control receiving of the frame including the signaling information that is transmitted using at least one of a first transmission scheme and a second transmission scheme, which are different from each other in access time to a broadcast channel, and acquiring the signaling information using at least one used scheme among the first transmission scheme and the second transmission scheme.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure will be presented in the following description.

Although an embodiment of the present disclosure will be described based on Digital Video Broadcasting (DVB)-Generic Stream Encapsulation (GSE) in DVB technology and Moving Picture Experts Group (MPEG) Media Transport (MMT) in MPEG technology among the digital broadcasting standards, it is not to limit the scope to which the present disclosure can be applied.

Figure 1:
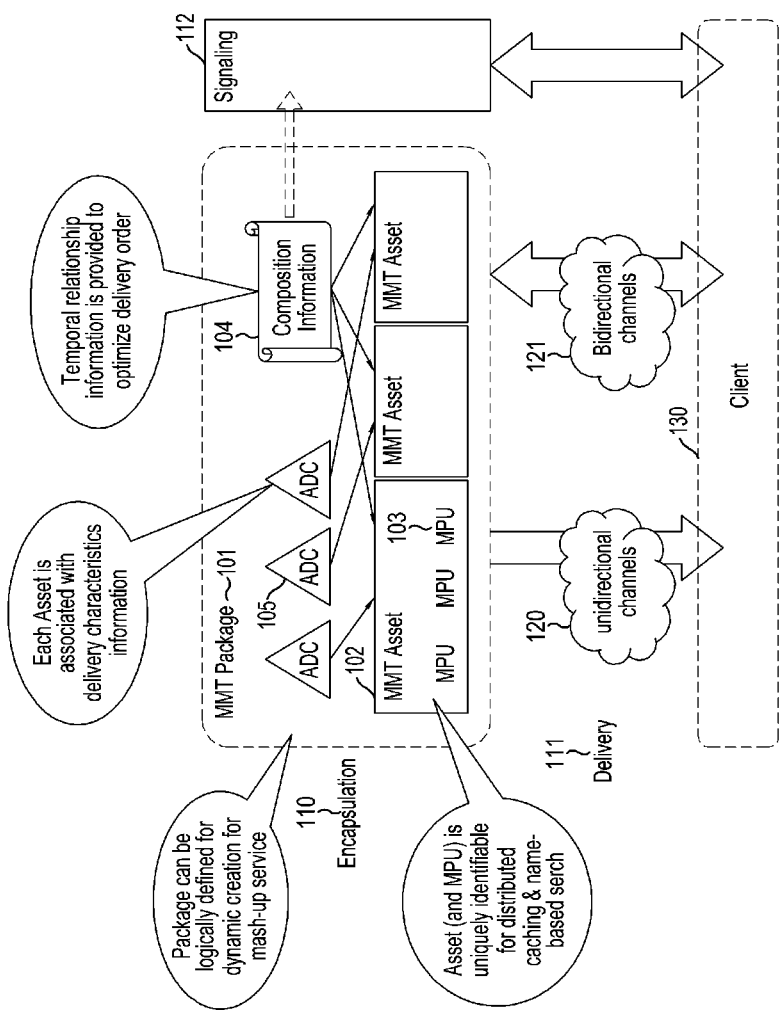
FIG. 1 illustrates a concept of Moving Picture Experts Group (MPEG) Media Transport (MMT) according to an embodiment of the present disclosure.

FIG. 1 illustrates the concept of MPEG MMT according to an embodiment of the present disclosure.

Referring to FIG. 1, MMT is the standard technology for efficiently transmitting hybrid content having multimedia elements such as video, audio and applications over the heterogeneous network consisting of the broadcasting network, the communications network and the like. MMT aims to overcome the disadvantages such as the limitations (e.g., the one-way communication, the inefficiency of transmission due to the fixed frame size, the occurrence of unnecessary overhead during transmission of content using the audio/video-specific transport protocol and Internet Protocol (IP), and the like) of Moving Picture Experts Group-2 (MPEG-2) Transport Stream (TS) used for transmission of multimedia content in the related-art broadcasting network, and may be construed as IP-friendly transmission technology, which is the basic technology of the multimedia transmission network.

MMT may define services or content using a logical object referred to as an MMT package 101. The MMT package 101 may include one or multiple MMT assets 102, Composition Information (CI) 104, and one or multiple Asset Delivery Characteristics (ADCs) 105. The MMT asset 102 may be an arbitrary media object such as single-property media object (e.g., video or audio), application, file and the like. The CI 104 may include consumption information for multiple MMT assets 102, and an example of the consumption information may be information about the MMT assets 102 themselves, and composition information used for arranging the MMT assets 102 on the screen in a spatial and temporal way. The ADC 105 may include information about media characteristics (e.g., the type of media, the transfer rate, the playback speed, the recommended capacity of the receive buffer, and the like) of each of the MMT assets 102. The MMT asset 102 may include a plurality of MMT Processing Units (MPUs) 103, and the MPU 103 may be the minimum unit of media, which can be independently consumed (or processed) in MMT. The MPU is also referred to as a media processing unit.

The MPU 103 may include one or multiple MMT Fragment Units (MFUs), and the MFU, which is the minimum data unit that is processed in MMT, may be one slice or Access Unit (AU) of, for example, a video frame. The MFU is also referred to as a media fragment unit. The MMT package 101 may be transmitted to a client 130 (e.g., a user terminal, a receiver and the like) over a unidirectional channel 120 or a bidirectional channel 121, and the client 130 may show (or display) the MMT package 101 for the user according to the information provided in the CI 104.

MMT may have three description areas for the above operation. The three description areas may include an encapsulation layer 110 (hereinafter referred to as a Layer E 110) that is responsible for creation of hybrid content, a delivery layer 111 (hereinafter referred to as a Layer D 111) that is responsible for efficient delivery (including the use of the heterogeneous network) of the created hybrid content, and a signaling layer 112 (hereinafter referred to as a Layer S 112) that provides information about the consumption and delivery of the hybrid content. The Layer E 110 may include an E.3 layer for creating a fragment (e.g., MFU) which is the basic unit of MMT, by receiving an input from a multimedia source, an E.2 layer for creating the MPU of MMT using the MFU, and an E.1 layer for making a format for creation, storage and delivery of hybrid content. The Layer D 111 may include a D.1 layer that is responsible for an application protocol that plays a similar role to that of a Real-time Transport Protocol (RTP) or a HyperText Transfer Protocol (HTTP), a D.2 layer that is responsible for a network layer protocol that plays a similar role to that of a User Datagram Protocol (UDP) and a Transmission Control Protocol (TCP), and a D.3 layer for a cross-layer optimization operation. The Layer S 112 is responsible for signaling may include an S.1 layer for providing information related to creation and consumption of hybrid content, and an S.2 layer for providing information related to delivery of hybrid content.

Figure 2:
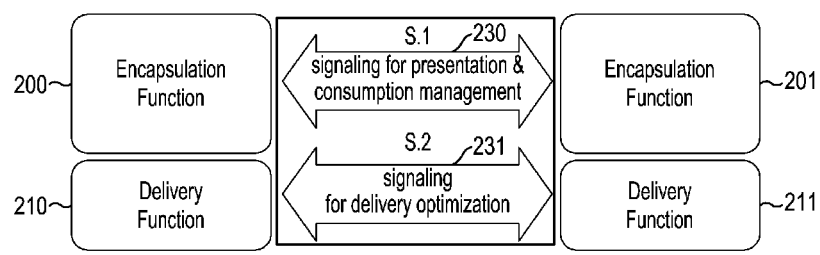
FIG. 2 illustrates the concept of MPEG MMT signaling according to an embodiment of the present disclosure.

FIG. 2 illustrates examples of layer messages sent from the Layer S described in FIG. 1 according to an embodiment of the present disclosure. The Layer-S message may include, for example, a plurality of S1 messages used to consume the MMT package 101 or the MMT asset 103, and a plurality of S2 messages related to delivery of the MMT package 101.

Referring to FIG. 2, an S.1 layer 230 may generate a signaling message based on the package information provided from a transmitter's encapsulation function (or layer) 200, and enable a receiver's encapsulation function (or layer) 201 to use the signaling message. An S.2 layer 231 may deliver information for transmission of the MMT package 101 or the MMT asset 102 from a transmitter's delivery function (or layer) 210 so that a receiver's delivery function (or layer) 211 may use the information. The receiver's delivery function 211 may provide the transmitter's delivery function 210 with the information used for proper transmission to the receiver by the transmitter.

Table 1 and Table 2 below illustrate brief examples of the S1 messages and the S2 messages, respectively. Detailed information about the S1 messages and the S2 messages is defined in the MPEG MMT standard.

TABLE 1

| S1 layer Signaling Messages related to the consumption of the Package | |
|---|---|
| Package Access (PA) message | It includes all tables used for Package access including an MMT Package Table and an MMT Composition Information Table. |
| MMT Composition Information (MCI) message | It includes an MCI table encapsulating a complete CI or a subset of CI. It may also include an MPT corresponding MCI table for fast Package consumption. |
| MMT Package Table (MPT) message | It includes an MMT Package Table providing all or a part of the information used for a single Package consumption. |
| Clock Relation Information (CRI) message | It includes a CRI Table providing the clock relation information used for the mapping between the NTP Clock and MPEG-2 System Time Clock. |
| Device Capability Information (DCI) message | It includes a DCI table providing the device capability information for a Package consumption. |
| Security Software Request (SSWR) message | It is used to request security software for consuming the MMT Package or Asset by an MMT receiving entity. It can also include a PA table or MPT. |

TABLE 2

| S2 layer Signaling Messages related to the delivery of the Package | |
|---|---|
| Measurement Configuration (MC) message | It provides information to configure a measurement. |
| Application Layer Forward Error Correction (AL-FEC) message | It provides AL-FEC configuration information. |
| Hypothetical Receiver Buffer Model (HRBM) message | It provides information to configure an HRBM operation. |
| Automatic Repeat-Request (ARQ) message | It provides information used for ARQ operation. |
| Reception Quality Feedback (RQF) message | It defines a format of a measurement report from a receiving entity. |

TABLE 2-continued

| S2 layer Signaling Messages related to the delivery of the Package | |
|---|---|
| Network Aware Media Feedback (NAMF) message | It defines a format of a NAM parameter report from a receiving entity. |

Figure 3:
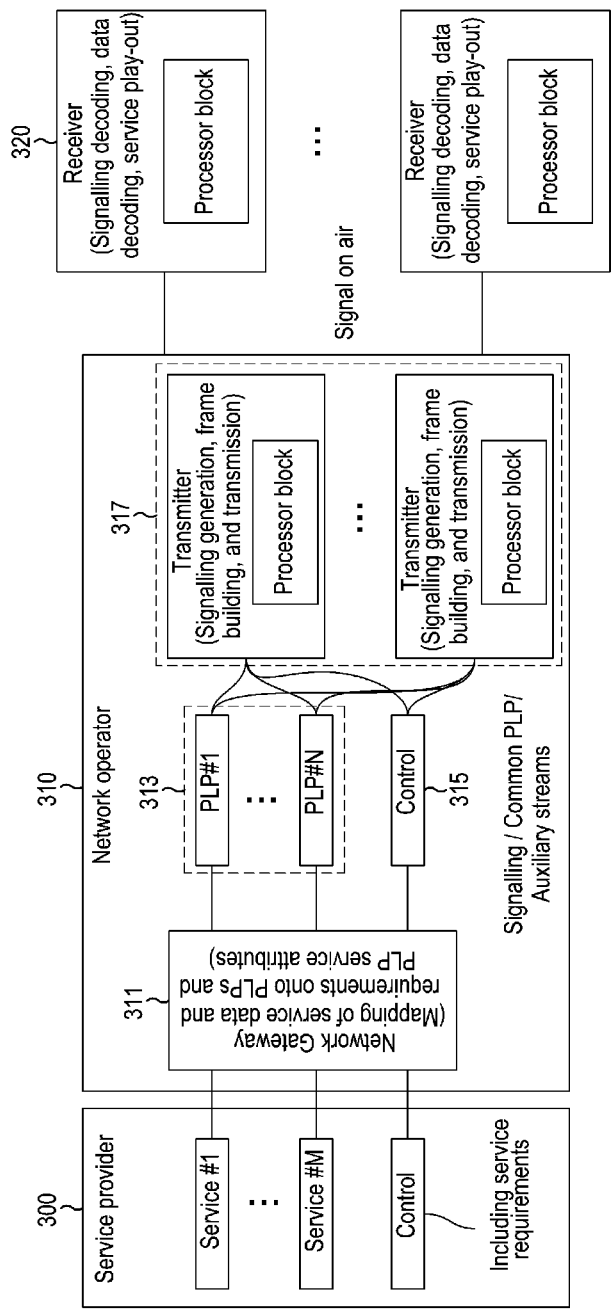
FIG. 3 illustrates the concept of a Digital Video Broadcasting (DVB) transmission network according to an embodiment of the present disclosure.

FIG. 3 illustrates an example of a DVB broadcasting system according to an embodiment of the present disclosure.

Referring to FIG. 3, a service provider 300, an entity for providing a service, may provide, to a network operator 310, with a broadcast service and information used for reception of the broadcast service. The network operator 310, an entity for operating the broadcasting network, may map the broadcast services it has received from the service provider 300 through a network gateway 311, to New Generation Handheld (NGH) Physical Link Pipe (PLPs) 313. The PLP is a logical channel used by a physical layer that gathers and delivers broadcast services having the same physical transmission characteristics. The network operator 310 may combine information used for reception of broadcast services delivered through the PLP, with information used for reception of the broadcast services provided by the service provider 300, and provide the combined information as control information 315 that receivers use for reception of the broadcast services. The broadcast services corresponding to PLPs 313 and the control information 315 may be transmitted to their associated transmitters 317, and then converted into physical broadcast signals in the transmitters 317, and transmitted to receivers 320 in their associated regions. The receivers 320 may receive the control information 315 and the broadcast services, and provide the broadcast services to the users.

Figure 4:
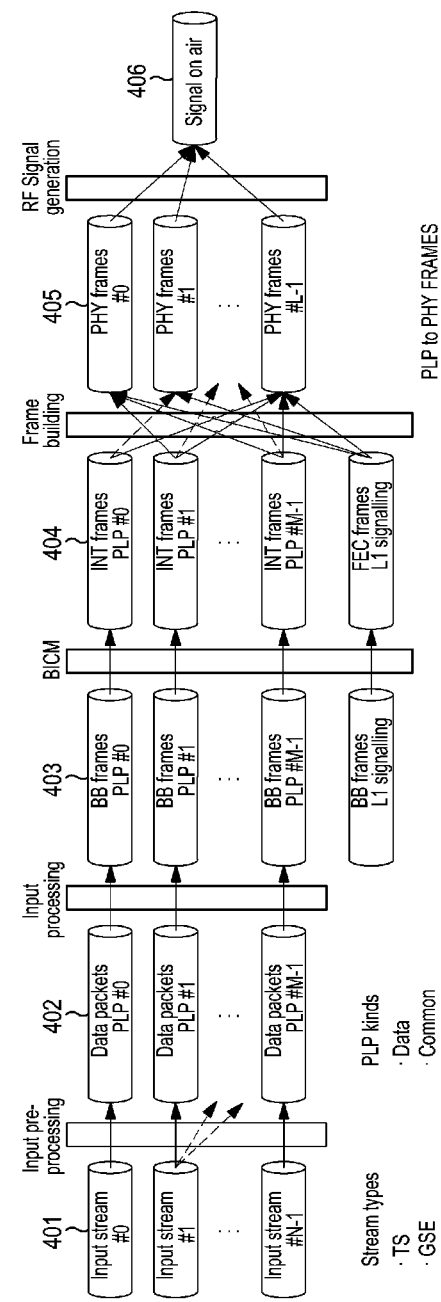
FIG. 4 illustrates the concept of DVB broadcasting transmission according to an embodiment of the present disclosure.

FIG. 4 illustrates a flow in which a broadcast service is transmitted in a digital broadcasting system according to an embodiment of the present disclosure.

Specifically, FIG. 4 illustrates an example in which a broadcast service is transmitted from a transmitter to a receiver in a DVB system, an example of a digital broadcasting system.

Referring to FIG. 4, in operation 401, an input stream may include broadcast data transmitted from an upper layer to a physical layer, and signaling information used to receive the broadcast data. The input stream may be delivered to the physical layer in the form of MPEG2 TS or DVB-GSE. MPEG2 TS, which is the broadcast transmission standard proposed in MPEG, may be suitable for transmission of audio, video and small amount of data, and DVB-GSE may be a protocol that is proposed in DVB, for transmission of a variety of Protocol Delivery Units (PDUs) having a variable length. DVB-GSE may be a protocol belonging to a Layer 2 (L2) layer which is a data link layer from the viewpoint of an Open Systems Interconnection (OSI) Reference Model 7 Layer. The input streams undergo an input pre-processing process known in the DVB standard in operation 401, and are processed as PLPs in an operation 402. As described in FIG. 3, a PLP may be a logical or physical stream for making the same PLP by gathering input streams having the same physical transmission characteristics and performing a post-processing process that can satisfy physical transmission characteristics. The PLPs may be divided into a PLP for transmitting data, and a PLP for transmitting data or signaling information that all receivers use in command. The PLPs undergo an input processing process including channel encoding and known in the DVB standard in operation 402, and are converted into a BaseBand (BB) frame in operation 403. The BB frame, which is the basic frame used in the baseband of the physical layer, may be converted into INTerleaved frames (INT frames) or Forward Error Correction (FEC) frames through Bit Interleaved Coded Modulation (BICM) which is a physical channel resistance enhancement and modulation process, and may include Layer 1 (L1) signaling that is provided through the physical layer. The INT frames or FEC frames undergo a physical frame creation process in operation 404, are converted into physical frames in operation 405 and then transmitted to receivers in operation 406.

Figure 5:
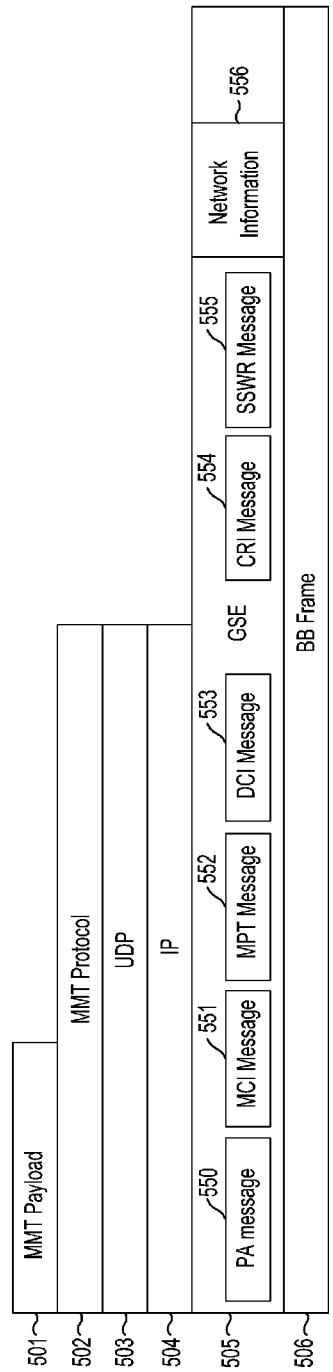
FIG. 5 illustrates a scheme for transmitting signaling information in a digital broadcasting system according to a first embodiment of the present disclosure.

FIG. 5 illustrates a scheme for transmitting signaling information in a digital broadcasting system according to a first embodiment of the present disclosure. Reference will be made to FIG. 5 to describe an embodiment of transmitting signaling information used for reception of MMT package and assets using DVB GSE.

Figure 7:
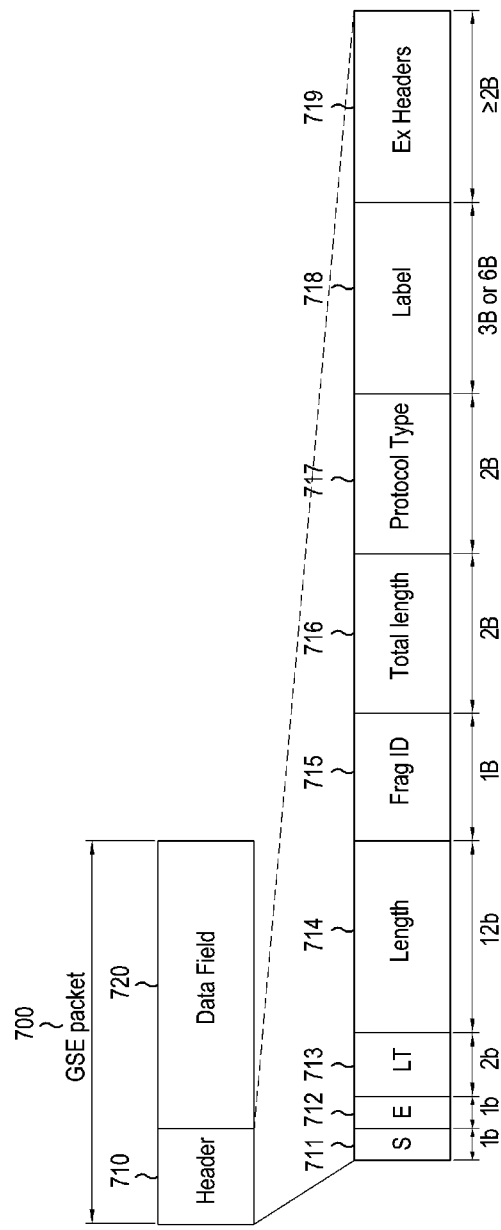
FIG. 7 illustrates the concept of DVB Generic Stream Encapsulation (GSE) according to an embodiment of the present disclosure.

Referring to FIG. 5, an MMT payload 501 may be an MMT payload that can contain MMT package/asset delivered from the Layer E, and signaling information delivered from the Layer S. An MMT protocol 502 may be an application layer protocol for transmitting the MMT payload 501. A UDP 503 and an IP 504 may be data transmission schemes that do not provide the transmission error correction function in the Internet environment. Although it is assumed in the description of FIG. 5 that the MMT protocol 502 uses the UDP 503 and the IP 504 during transmission, the MMT protocol 502 may transmit the signaling information using any other protocols without using the UDP 503 and the IP 504. The detailed function of DVB GSE 505 is illustrated in FIG. 7. In addition, a BB frame 506 may be included. In the following description, delivering MMT signaling information used to consume MMT package and assets will be mainly described, but MMT signaling information used for transmission may also be delivered in a similar way.

FIG. 7 illustrates the concept of DVB Generic Stream Encapsulation (GSE) according to an embodiment of the present disclosure.

Referring to FIG. 7, a GSE packet 700 may include a GSE header 710 for providing information used for processing of the GSE packet 700, and a data field 720 for transmitting actual data. The GSE header 710 may include a Start indicator (S) 711, an End indicator (E) 712, a Label Type indicator (LT) 713, GSE packet length (Length) 714, a Frag IDentifier (ID) 715, PDU's total length 716, a protocol type 717, a label 718 and an extension header 719. The start indicator 711, a 1-bit indicator, may denote that the GSE packet transmits the first fragment of an upper PDU, if the start indicator 711 has a value of '1'. The end indicator 712, a 1-bit indicator, may denote that the GSE packet transmits the last fragment of an upper PDU, if the end indicator 712 has a value of '1'. For a GSE packet transmitting an intermediate fragment of the upper PDU, values of its start indicator 711 and end indicator 712 may be set as '0' and '0', respectively. The label type indicator 713, a 2-bit indicator, may indicate the type of a label which is an address of a GSE layer used in the GSE packet 700. The label may be used by receivers to distinguish the GSE packet 700 that the receivers should receive. The label type indicator 713 may denotes that a 6-byte label (an address in a GSE layer) is used, if the label type indicator 713 has a value of '00'; denote that a 3-byte label is used, if the label type indicator 713 has a value of '01'; denote that no label is used, if the label type indicator 713 has a value of '10'; and denote that a label is reused, if the label type indicator 713 has a value of '11'. The value of '11' may be used to prevent the waste due to repeated transmission of the label, but the first GSE packet of the BB frame, in which GSE packets 700 are transmitted, should have label information in its header, and the value of '11' may be used beginning from the next GSE packet, so as not to repeat transmission of the label.

A situation may occur, in which even in the GSE packet 700, padding should be performed because the upper PDU is shorter in length than the BB frame, and transmission of padding data can be indicated by a combination of values of the start indicator 711, the end indicator 712 and the label indicator 713. If values of the three indicators are all '0', this denotes that padding bits are included in the data field 720 of the GSE packet 700. The GSE length field 714 has a length of 12 bits, and a length of the GSE packet 700 from the first bit after the GSE length field 714 up to the last bit of the data field 720 (or the last bit of the data field 720 just before the padding bits) may be represented in bytes, and may indicate a maximum of 4096 bytes. The Frag ID field 715 may be used to identify fragmented PDUs. In other words, all of the fragmented PDUs that are transmitted as several GSE packets 700 after fragmented from one PDU may have the same identifier value. The Total length field 716 may indicate a total length of a PDU that is transmitted over the GSE packets 700, and may have a length of 16 bits. The protocol type 717 is a 16-bit field indicating a protocol type of and the presence/absence of the extension header 719 of a PDU that is transmitted over the data field 720 of the GSE packet 700. Type 1 (from 0 to 1535) indicates the presence and type of the extension header 719, and the PDU type, and Type 2 (from 1536 to 65535) indicates a PDU protocol type. The label 718, a field in which a value of the above described label is transmitted, may indicate a length of 6 or 3 bytes, and the extension header 719 may be used to provide additional information in addition to the information provided in the header 710.

Referring back to FIG. 5, the first embodiment provides a scheme in which an MMT signaling message (or signaling information), especially a message used for consumption of the MMT package/asset is transmitted not by the MMT payload, but through DVB-GSE. The reason for transmitting signaling information through DVB-GSE is to minimize the time for which a receiver accesses the channel over which the next-generation broadcast service processed by MMT is transmitted. In order to access the information for consumption of the MMT package/asset transmitted in the MMT payload, a receiver (or terminal) may analyze a DVB physical layer signal, and analyze DVB-GSE, and then, the receiver may analyze DVB-GSE IP streams, and receive a UDP/IP stream in which an MMTP (i.e., MMT packet) is transmitted. Thereafter, the receiver may find an MMT payload transmitting the MMT signaling message, and acquire and analyze a signaling message, thereby accessing the broadcast channel on which the MMT package/asset is transmitted. If the signaling message used for consumption of the MMT package/asset is transmitted through DVB-GSE, the receiver may remarkably shorten the channel access time. In other words, after acquiring a physical layer signal, the receiver may immediately access the broadcast channel by receiving DVB-GSE and analyzing an MMT signaling message.

Referring to FIG. 5, S1 messages (e.g., a PA message 550, an MCI message 551, an MPT message 552, a DCI message 553, a CRI message 554 and a Security Software Request (SSWR) message 555) are as described in Table 1, and there are two possible ways to transmit the S1 messages through GSE. A first way is to transmit the PA message 550 and the MCI message 551 among the S1 messages using a separate GSE packet, and a second way is to transmit the S1 messages through the same GSE packet. Further, network information 556 may be included.

In the below-described embodiments, various transmission schemes for the PA message and the MCI message will be described. Although different reference numerals are given to the PA messages and the MCI messages in different drawings for the distinction of embodiments, the information included in the PA messages and the MCI messages should be construed to have the same configuration.

Figure 8:
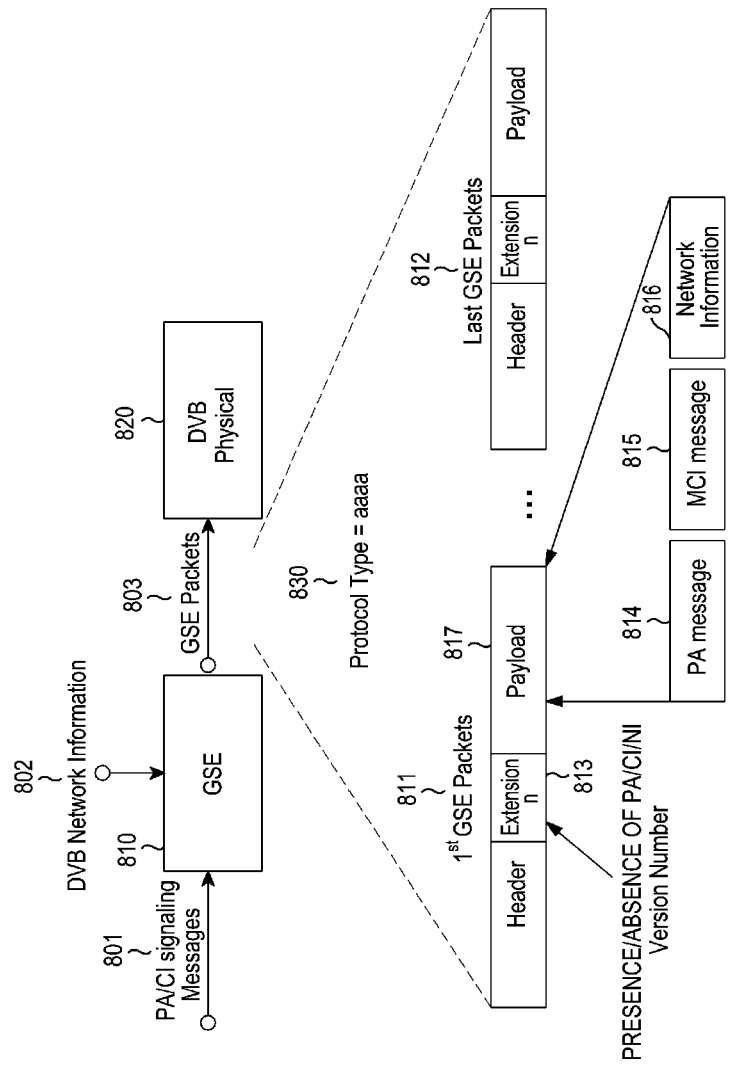
FIG. 8 illustrates a scheme for transmitting DVB GSE-based MMT signaling according to the first embodiment of the present disclosure.

FIG. 8 illustrates a scheme for transmitting DVB GSE-based MMT signaling according to the first embodiment of the present disclosure. This scheme corresponds to the first way to transmit the PA message and the MCI message among the signaling messages using a separate GSE packet.

Referring to FIG. 8, a PA message 814 may include information for accessing the MMT package and asset. The PA message 814 may include at least one of, for example, location information of the MMT package, asset information constituting the MMT package, a message for providing detailed information about the asset, and location information of an MMT package table. The PA message 814 may optionally include composition information for arranging the MMT package/asset on the screen. The MCI message 815, which is a message transmitting the composition information, may have information for arranging various assets in the MMT package in a spatial and temporal way, and information about the assets, so the two messages may be construed to include the signaling information that should be acquired to receive the broadcast service provided through MMT.

As described above, since the MMT package includes a plurality of assets, receiving all of the plurality of assets and providing them to the receiver may cause a delay in the service acquisition time, so MMT may support an operation of providing information about the most basic asset in the package and sequentially providing information about additional assets. Therefore, in FIG. 8, MMT Packet Access (PA)/Composition Information (CI) signaling messages 801 being input to GSE 810 may be full information about the MMT package, and may be information about the most basic asset in the MMT package. GSE may provide even DVB network information 802, and the basic information provided in the DVB network may be information (e.g., a Network Information Table (NIT)) about the DVB network and connection information (e.g., a System Information Table (SIT)) between a DVB channel and an upper channel. The second-generation DVB mobile network may provide an example of the above information using NGH as follows. Table 3 below illustrates information (referred to as NIT) about the DVB NGH network, and Table 5 below illustrates an SIT indicating the connection relationship between the DVB physical channel/logical channel 820 and the upper channel. In broad terms, the signaling information may be construed to include the signaling messages 801 and the DVB network information 802.

Table 3 illustrates an example of the NIT, and Table 4 illustrates each field in Table 3.

TABLE 3

| Syntax | Number of bits | Identifier |
|---|---|---|
| Network_Information( ) { | | |
| NGH_system_id | 16 | uimsbf |
| cell_id | 16 | uimsbf |
| number_RF | 3 | uimsbf |
| for (i=0; i<number_RF; i++) { | | |
| RF_id | 3 | uimsbf |
| bandwidth | 4 | uimsbf |
| transmission_mode | 3 | uimsbf |
| guard_interval | 4 | uimsbf |
| common_clock_reference_id | 4 | uimsbf |
| in_band_flag | 1 | uimsbf |
| if (in_band_flag){ | | |
| ngh_slot_length | 12 | uimsbf |

TABLE 3-continued

| Syntax | Number of bits | Identifier |
|---|---|---|
| ngh_slot_interval | 24 | uimsbf |
| } | | |
| } | | |
| } | | |
| number_of_LNC | 3 | uimsbf |
| for (i=0; i<number_of_LNC; i++){ | | |
| RF_main; | 3 | uimsbf |
| nof_PLP; | 8 | uimsbf |
| for (j=0; j<nof_PLP; j++){ | | |
| PLP_id; | 8 | uimsbf |
| } | | |
| } | | |
| } | | |

TABLE 4

| Field | Definitions |
|---|---|
| NGH_system_id | Field indicating ID of NGH network. |
| cell_id | Field indicating ID of NGH cell. |
| number_RF | Field indicating the number of Radio Frequencies (RFs) existing in the cell indicated by Cell ID. |
| RF_id | Field indicating RF ID. |
| bandwidth | Field indicating RF transmission band. |
| transmission_mode | Field indicating NGH transmission mode. |
| guard_interval | Field indicating guard interval between Orthogonal Frequency-Division Multiplexing (OFDM) cells. |
| common_clock_reference_id | Field indicating ID of command clock used in system. |
| in_band_flag | Field indicating use/nonuse of in-band signaling. |
| ngh_slot_length | Field indicating current slot length corresponding to the number of OFDM cells. |
| ngh_slot_interval | Field indicating the number of T intervals between current NGH slot and next slot. |
| number_of_LNC | Field indicating the total number of LNCs in the current NGH system. |
| RF_main; | Field indicating main RF. |
| nof_PLP; | Field indicating the number of PLPs in the current LNC. |
| PLP_id; | Field indicating PLP ID. |

Table 5 illustrates an example of the SIT, and Table 6 illustrates each field in Table 5.

TABLE 5

| Syntax | Number of bits | Identifier |
|---|---|---|
| service association section( ) { | | |
| section_length | 32 | uimsbf |
| number_of_services | 8 | uimsbf |
| for (i=0; i<N; i++){ | | |
| number_of_components | 8 | bslbf |
| for (j=0; j<N1; j++) { | | |
| URL_length | 8 | bslbf |
| for (k=0; k<N2; k++) { | | |
| URL_byte or IP address + port number | 8 | uimsbf |
| } | | |
| context_id | 8 or 16 | uimsbf |
| context_profile | 8 | uimsbf |
| static_info_length | 8 | uimsbf |
| for (l=0; l<N3; l++) { | | |
| static chain byte( ) | 8 | bslbf |
| } | | |
| Anchor_flag | 1 | uimsbf |
| PLP_id | 8 | uimsbf |
| MIMO_mode | 2 | uimsbf |
| RFU | 5 | uimsbf |

TABLE 5-continued

| Syntax | Number of bits | Identifier |
|---|---|---|
| } | | |
| T_INT_APLPF | 16 | uimsbf |
| BS_APLPF | 24 | uimsbf |
| } | | |
| CRC_byte | 32 | uimsbf |
| } | | |

TABLE 6

| Field | Definitions |
|---|---|
| section length | Field indicating length of section. |
| number of services | Field indicating the number of broadcast services delivered over current channel. |
| number of components | Field indicating the number of components delivered through the broadcast service in broadcast service loop. |
| Uniform Resource Locator (URL) length | Field indicating length of 'URL_byte or IP address + port number' field indicating each component. |
| URL_byte or IP address + port number | Text byte field of URL_byte value indicating each component, or IP address + port number indicating IP channel on which each component is transmitted. |
| Context ID (CID) | Field indicating CID of compressed IP stream. |
| context profile | Field indicating context profile of compressed IP stream. |
| static info length | Field indicating length of static chain byte sequence. |
| static chain byte | Field indicating byte sequence which is static information of compressed IP stream. |
| Anchor Flag | Field indicating that PLP is an anchor of all related PLPs of given broadcast service. |
| PLP ID | Field indicating ID of PLP in which the component is delivered. |
| MIMO_MODE | Field indicating use of Single Input Single Output (SISO)/Multiple Input Multiple Output (MIMO) structure. |
| T_INT_APLPF | Field indicating time (milliseconds or OFDM symbols) between two consecutive frames of all broadcast service-related PLPs. |
| BS_APLPF | Field indicating maximum buffer size (e.g., maximum size of allocated PLP frames) in OFDM cells. |
| CRC byte | Field indicating Cyclic Redundancy Check (CRC) bytes of associated section. |

In the first way to transmit the PA message and the MCI message using a separate GSE packet, as in the example of FIG. 8, an extension header 813 may be set up in GSE packets 803, which include a first GSE packet 811 to last GSE packet 812, and the presence/absence of information (the NIT and SIT) of the PA message 814, the MCI message 815 and the network information 816, which are transmitted through a payload 817, may be represented in the extension header 813.

As described in the example of FIG. 7, Type 1 of the protocol type 717 of the GSE packet may provide the presence/absence of the extension header 719 and provide the type of information indicated by the extension header 719.

Therefore, as an unused arbitrary value among the values of 0 to 1535 is assigned to a protocol type 830 of the GSE packets 803 in the protocol type of the GSE packets 803 as in the example of FIG. 8, a receiver which has received the GSE packets 803 may determine that the PA message 814, the MCI message 815 and the network information 816 are transmitted through the payload 817 of the GSE packets 803. In addition, based on the protocol type assigned as an arbitrary value, the receiver may determine that version information of the PA message 814, the MCI message 815 and the network information 816 is included in the extension header 813 of the GSE packets 803.

As such, the receiver may be allowed to acquire version information of the PA message 814, the MCI message 815 and the network information 816 based on the extension header 813 before analyzing the PA message 814, the MCI message 815 and the network information 816, so if the PA message, MCI message and network information that the receiver has newly received is the same as the previously received information (e.g., NIT and SIT), the receiver may not be allowed to process the newly received NIT/SIT. If the amount of data for the PA message 814, the MCI message 815 and the network information 816 is greater than the amount of data that can be transmitted through one GSE packet, multiple GSE packets may be used. If GSE protocol type 2 is used, only the protocol type for transmitting MMT signaling may be defined, and detailed information about each message may be determined by analyzing the messages transmitted through the payload on a one by one basis.

An example of configuration (Base CI (Subset-0 CI)) of CI providing information about the most basic asset in the MCI message 815 is given in Table 7 below.

TABLE 7

```
<html>
<head>
<title>Entertainment</title>
<MMT-CI:view id="View1" >
<MMT-CI:divLocation id="divL1" MMT-CI:refDiv="Area1" />
<MMT-CI:divLocation id="divL2" MMT-CI:refDiv="Area2" />
<MMT-CI:divLocation id="divL3" MMT-CI:refDiv="Area3" />
</MMT-CI:view>
</head>
<body>
<div id="Area1">
<video id="Video1" src="mmt://Video1" />
<audio id="Audio1" src="mmt://Audio1" />
</div>
<div xmlns:xlink="http://www.w3.org/1999/xlink"
xlink:href="mmt://CI.subset.1" xlink:actuate="onRequest" />
</body>
</html>
```

So far, a description has been made of an example of the first way to transmit the PA message and the MCI message among the signaling messages using a separate GSE packet.

Since the PA message and the MCI message deliver the information used for access to MMT-based next-generation broadcast services, if the PA message and the MCI message are transmitted more often than the other MMT signaling messages, the broadcast channel access time of the receiver may be minimized. In order to reduce the MMT signaling information acquisition time of the receiver, information about GSE in which other signaling messages are transmitted may be provided through the extension header.

Figure 9:
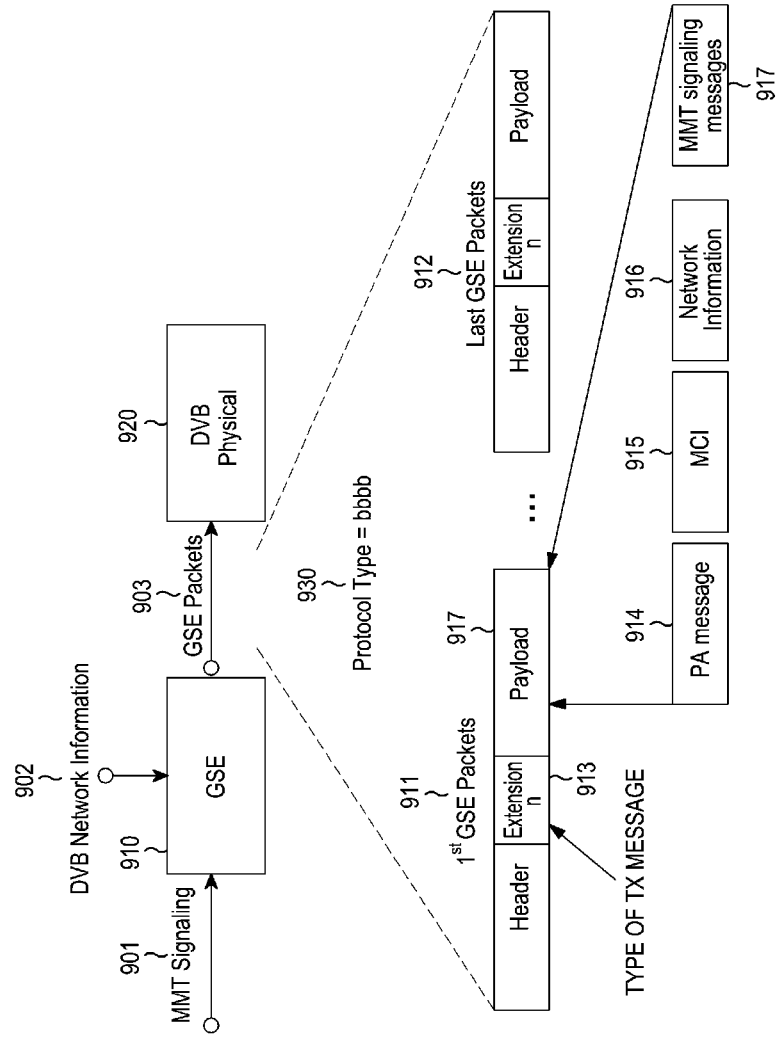
FIG. 9 illustrates another scheme for transmitting DVB GSE-based MMT signaling according to the first embodiment of the present disclosure.

FIG. 9 illustrates another scheme for transmitting DVB GSE-based MMT signaling according to the first embodiment of the present disclosure. This scheme corresponds to the second way to transmit the signaling messages using the same GSE packet.

Referring to FIG. 9, MMT signaling messages 901 being input to GSE 910 may further include at least one of the signaling messages (e.g., the MPT message 552, the DCI message 553, the CRI message 554 and the SSWR message) described in Table 1, in addition to a PA message 914, an MCI message 915, network information 916, and MMT signaling messages 919. In addition, GSE 910 may provide DVB network information 902 as in the example of FIG. 8, and the DVB network information 902 may be information (e.g., NIT) about the DVB network and connection information (e.g., SIT) between a DVB channel and an upper channel. In the second way, as in the example of FIG. 9, an extension header 913 may be set up in GSE packets 903, which include a first GSE packet 911 to last GSE packet 912, and the types of the signaling messages transmitted through a payload 917 may be represented in the extension header 913. The GSE packets 903 are communicated to a DVB physical channel 920. Based on an arbitrary value (e.g., bbbb) assigned to a protocol type 930 of the GSP packets 903 in FIG. 9, the receiver may determine that the signaling messages and the network information 902 are transmitted through the payload 917.

Figure 6:
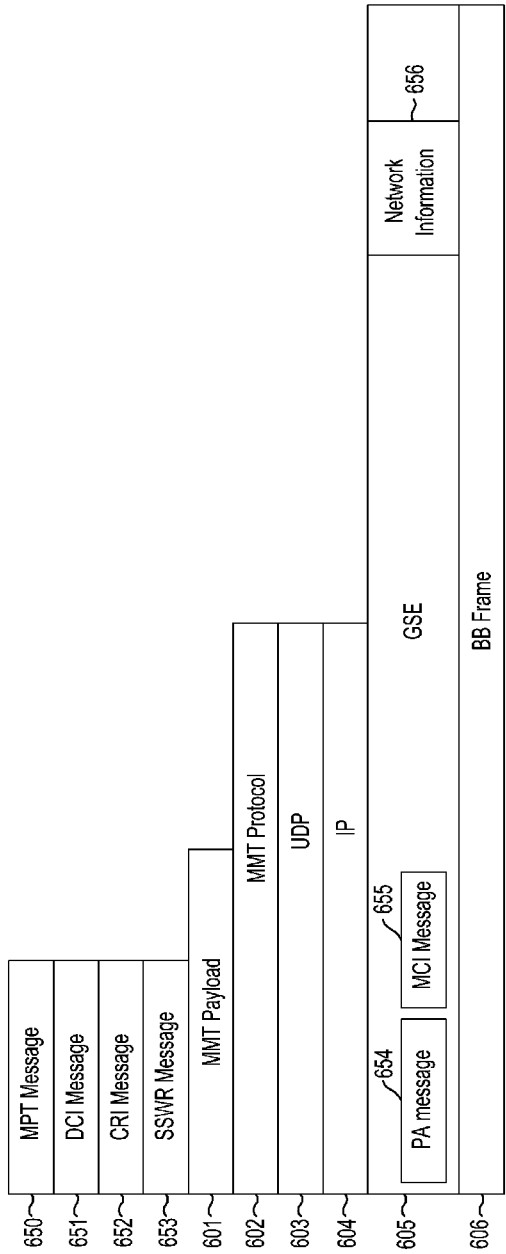
FIG. 6 illustrates a scheme for transmitting signaling information in a digital broadcasting system according to a second embodiment of the present disclosure.

FIG. 6 illustrates a scheme for transmitting signaling information in a digital broadcasting system according to a second embodiment of the present disclosure.

Referring to FIG. 6, in the second embodiment, a PA message 654, an MCI message 655 and network information 656 (same as the network information 556 in FIG. 5), which are to be received at the receiver for fast access to MMT package/asset, among the signaling messages, may be transmitted through GSE, and the other signaling messages (e.g., an MPT message 650, a DCI message 651, a CRI message 652 and a SSWR message 653) may be included in MMT payload 601 and transmitted through GSE 605 using an MMT protocol 602, a UDP 603, an IP 604, and BB frame 606. In the second embodiment, the signaling messages (e.g., the PA message and the MCI message) used for fast reception of the MMT-based next-generation broadcast services may be transmitted using the GSE 605, and the other signaling messages may be may be transmitted using MMT, thereby making it possible to reduce the burden of the MMT signaling messages in GSE.

Figure 10:
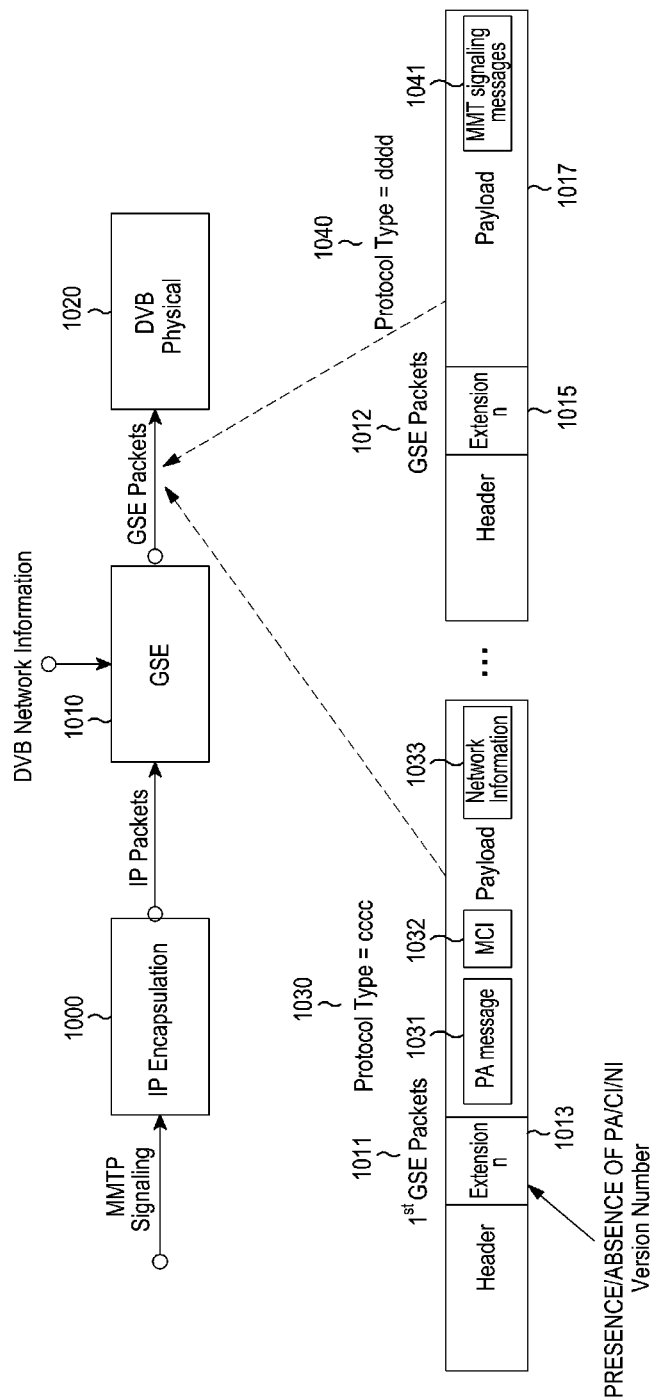
FIG. 10 illustrates a scheme for transmitting DVB GSE-based MMT signaling according to the second embodiment of the present disclosure.

FIG. 10 illustrates a scheme for transmitting DVB GSE-based MMT signaling according to the second embodiment of the present disclosure. This scheme corresponds to a GSE operation for the second embodiment in FIG. 6.

Referring to FIG. 10, IP encapsulation 1000 may create an IP packet by receiving an MMT signaling message, and then deliver the IP packet to GSE 1010. GSE 1010 may create two types of GSE packets. In the example of FIG. 10, a GSE packet 1011 with protocol type=cccc 1030 and a GSE packet 1012 with protocol type=dddd 1040 may be created as the two types of GSE packets.

The GSE packet 1011 with protocol type=cccc 1030 may provide the presence/absence of a PA message 1031, an MCI message 1032 and network information 1033 and version information thereof, through an extension header 1013. The configuration method for the GSE packet 1011 is similar to that in the example of FIG. 8. As for the GSE packet 1012 with protocol type=dddd 1040, MMT signaling messages 1041 except for the PA message 1031 and the MCI message 1032 among the signaling messages in Table 1 may be included in a payload 1017. The GSE packet 1012 may provide information indicating the types of the MMT signaling messages 1041 included in the payload 1017, using an extension header 1015.

In the example of FIG. 10, the GSE packet 1011 including the PA message 1031, the MCI message 1032 and the network information 1033 may be transmitted in a DVB physical layer 1020 using the GSE 605, and the GSE packet 1012 including the MMT signaling messages 1041 may be transmitted using MMT. In a receiver of the MMT signaling messages 1041 transmitted through MMT, the extension header 1015 may indicate the location of DVB GSE in which the MMT signaling messages 1041 are transmitted, to help fast acquisition.

The MMT signaling message transmitted using GSE in the example of FIG. 6 and the signaling messages transmitted using MMT in the example of FIG. 10 may be freely configured according to the intention of the operator.

Figure 11:
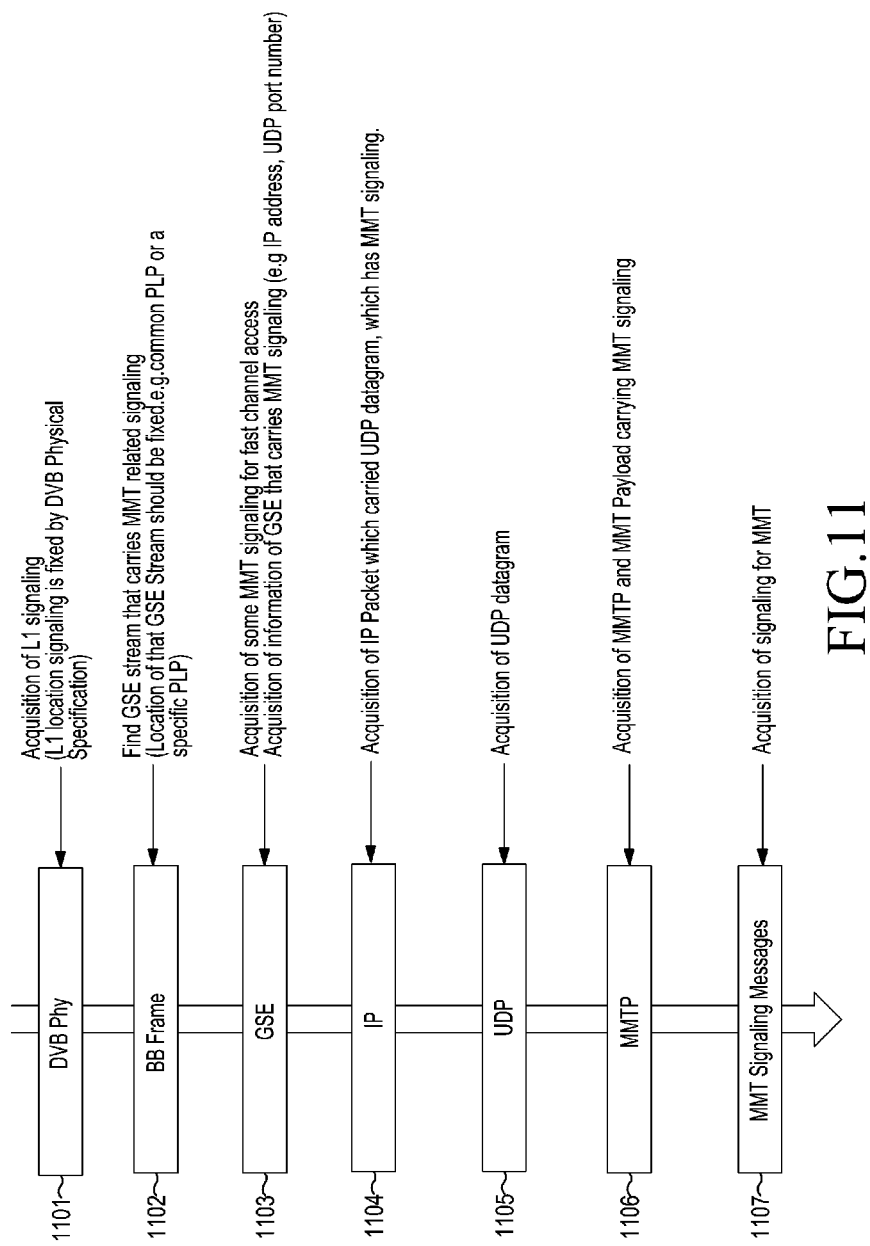
FIG. 11 illustrates a method of receiving MMT signaling information in a receiver of a digital broadcasting system according to an embodiment of the present disclosure.

FIG. 11 illustrates an operation of receiving an MMT signaling message in a receiver of a digital broadcasting system according to an embodiment of the present disclosure.

Referring to FIG. 11, in operation 1101, the receiver may receive Layer-1 signaling information from a DVB physical layer, to receive information about the DVB physical layer and information for L2 reception. The location of the Layer-1 signaling information may be defined in advance by the DVB standard. In operation 1102, the receiver may find a GSE stream that carries MMT signaling information in a BB frame. In order to promote the convenience of the receiver operation and to reduce the signaling overhead, it is beneficial to define in advance the location of GSE carrying the MMT signaling message. To this end, the BB frame and the PLP location in the BB frame may be fixed.

Thereafter, in operation 1103, the receiver may acquire some MMT signaling messages that can fast access the channel over which a broadcast service is delivered in GSE. As an example, these signaling messages may be the PA message or the MCI message. The GSE may provide information about the network over which the other signaling messages are transmitted, for fast acquisition of other messages. The network information may include a DVB physical layer address, a GSE address, an IP address, a UDP port and the like, with which other signaling messages are transmitted. The receiver may acquire an IP packet including an MMT signaling message in operation 1104, and acquire a UDP datagram in operation 1105. Thereafter, the receiver may acquire an MMT Packet (MMTP) from the UDP datagram in operation 1106, and acquire the other MMT signaling messages from the MMTP in operation 1107, completing the preparation to receive the MMT package/asset.

The signaling information received in the reception operation of FIG. 11 may be transmitted using any one of the MMT signaling transmission schemes described in the examples of FIGS. 5 to 10.

Figure 12:
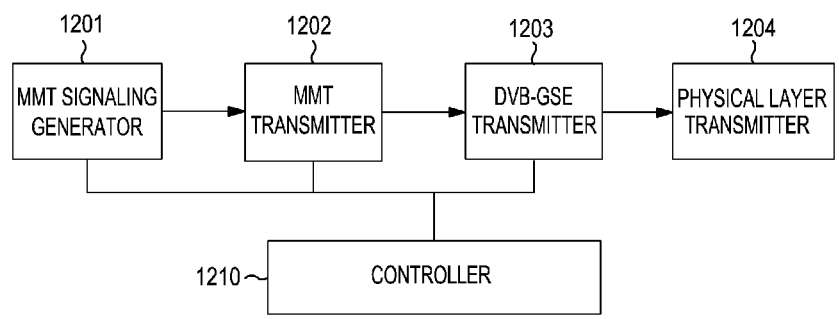
FIG. 12 illustrates a configuration of a transmitter for transmitting MMT signaling information using DVB-GSE according to an embodiment of the present disclosure.

FIG. 12 illustrates a configuration of a transmitter for transmitting MMT signaling information using DVB-GSE according to an embodiment of the present disclosure.

Referring to FIG. 12, an MMT signaling generator 1201 may generate the above-described MMT signaling messages in accordance with the method defined in the MMT standard. An MMT transmitter 1202 may transmit the MMT signaling messages in accordance with the methods defined in the MMT standard and described in the examples of FIGS. 5 to 10. A DVB-GSE transmitter 1203 may generate a GSE packet used to carry an MMTP in accordance with the methods described in the examples of FIGS. 5 to 10, and transmit the related signaling information using GSE. A physical layer transmitter 1204 is responsible for a physical layer' operation of transmitting the GSE packet generated by the DVB-GSE generator 1203 in accordance with the method defined in the DVB standard. A controller 1210, which controls the overall operation, may control the MMT signaling generator 1201, the MMT transmitter 1202 and the DVB-GSE transmitter 1203 in accordance with the methods proposed in the examples of FIGS. 5 to 10, and transmit the signaling information using MMT and DVB-GSE.

Although not illustrated, the transmitter may be implemented with a controller and a transmission unit. The controller may control an operation of generating signaling information for reception of a broadcast service according to the ways described in the examples of FIGS. 5 to 10, and transmitting the signaling information using a first transmission scheme (e.g., GSE scheme) having a relatively fast access time to the broadcast channel, or transmitting the signaling information using both the first transmission scheme and a second transmission scheme (e.g., MMT scheme), which have different access times to the broadcast channel. If only the first transmission scheme (e.g., GSE scheme) is used, the signaling information may be transmitted by transmitting the PA message and the MCI message used for reception of a broadcast service using a separate GSE packet as in the example of FIG. 8, or by transmitting a plurality of signaling messages using the same GSE packet as in the example of FIG. 9. If both of the first transmission scheme and the second transmission scheme (e.g., MMT scheme) are used, the controller may separate the signaling information into first signaling information and second signaling information, and transmit them separately. In this case, the transmission unit, under control of the controller, may transmit a packet including the first signaling information and a packet including the second signaling information using the first transmission scheme (e.g., GSE scheme) and the second transmission scheme (e.g., MMT scheme), respectively. The first signaling information may include the PA message or the MCI message, and include the network information.

Figure 13:
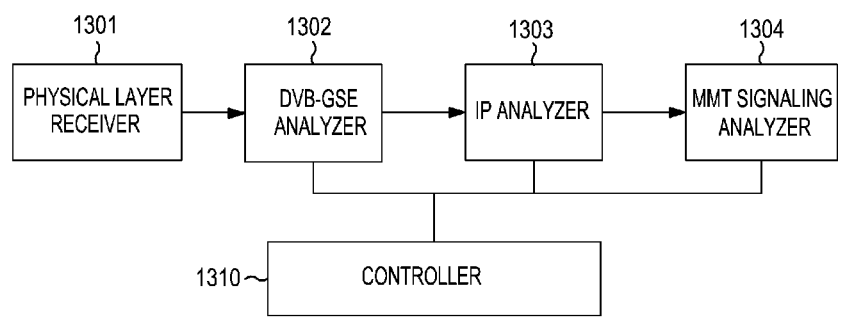
FIG. 13 illustrates a configuration of a receiver for receiving MMT signaling information using DVB-GSE according to an embodiment of the present disclosure.

FIG. 13 illustrates a configuration of a receiver for receiving MMT signaling information using DVB-GSE according to an embodiment of the present disclosure.

Referring to FIG. 13, a physical layer receiver 1301 is responsible for an operation of receiving and processing a DVB physical channel, and a DVB GSE analyzer 1302 may analyze a DVB-GSE packet output from the physical layer receiver 1301 and deliver an MMT signaling message to an MMT processor (not shown), or may reconstruct an MMTP that carries the MMT signaling message. If the second embodiment of the present disclosure is applied, an IP analyzer 1303 may reconstruct an MMTP carrying a signaling message. An MMT signaling analyzer 1304 may analyze an MMT signaling message in the received MMTP, and analyze the MMT signaling message delivered from the DVB GSE analyzer 1302 to perform the operation. A controller 1310 may control an operation of controlling operations of the physical layer receiver 1301, the DVB GSE analyzer 1302, the IP analyzer 1303 and the MMT signaling analyzer 1304 in accordance with the ways described in the examples of FIGS. 5 to 10, and receiving and processing the MMT signaling message.

Although not illustrated, the receiver may be implemented with a controller and a reception unit. The controller may control an operation of receiving a frame including signaling information that is transmitted using at least one of a first transmission scheme (e.g., GSE scheme) and a second transmission scheme (e.g., MMT scheme) having different access times to a broadcast channel in accordance with the ways described in the examples of FIGS. 5 to 10, and of acquiring the signaling information using at least one used scheme among the first transmission scheme and the second transmission scheme. The reception unit may receive the frame under control of the controller. If the signal information is transmitted using only the first transmission scheme (e.g., GSE scheme), the signaling information may be transmitted by transmitting the PA message and the MCI message used for reception of a broadcast service using a separate GSE packet as in the example of FIG. 8, or by transmitting a plurality of signaling messages using the same GSE packet as in the example of FIG. 9. In this case, during reception of a frame, the receiver may receive the signaling information in accordance with the first transmission scheme (e.g., GSE scheme).

As is apparent from the foregoing description, an embodiment of the present disclosure may provide an apparatus and method for efficiently transmitting signaling information that is used when providing the MPEG MMT-based next-generation broadcast service using a DVB network. In addition, the present disclosure may provide a structure for transmitting MMT signaling information using the DVB network.

Furthermore, the present disclosure may provide the function that should be added to DVB-GSE when MMT signaling information is transmitted using DVB-GSE.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting signaling information in a digital broadcasting system, the method comprising:
    generating signaling information associated with a broadcast service; and
    transmitting the signaling information,
    wherein at least part of information associated with a second transmission scheme among the signaling information is transmitted based on a first transmission scheme,
    wherein the first transmission scheme includes a generic stream encapsulation (GSE) scheme in a digital video broadcasting (DVB) system, and
    wherein the second transmission scheme includes a moving picture experts group (MPEG) media transport (MMT) scheme.

2. The method of claim 1, wherein the signaling information includes first signaling information used for reception of the broadcast service, and the first signaling information is transmitted based on the first transmission scheme.

3. The method of claim 1, wherein the first transmission scheme is faster than the second transmission scheme in terms of an access time.

4. The method of claim 2, wherein the first signaling information includes at least one of a package access (PA) message, a MMT composition information (MCI) message, and network information in a MMT system.

5. The method of claim 1,
    wherein the signaling information includes second signaling information including remaining signaling information except for the first signaling information, and
    wherein the second signaling information is transmitted based on at least one of the first transmission scheme and the second transmission scheme.

* * * * *